United States Patent

[11] 3,629,697

[72] Inventors: Marie-Anne Bouchiat;
Jean Brossel; Claude N. Cohen-Tannoudji;
Jacques A. Dupont-Roc; Serge Haroche;
Alfred H. Kastler, all of Paris; Jean-Claude
Lehmann, Boulogne, all of France
[21] Appl. No. 883,900
[22] Filed Dec. 10, 1969
[45] Patented Dec. 21, 1971
[73] Assignee Agence Nationale De Valorisation De La
Recherche A.N.V.A.R.
Puteaux, France
[32] Priority Dec. 12, 1968
[33] France
[31] 177928

[54] PARAMAGNETIC RESONANCE AND OPTICAL PUMPING MAGNETOMETER IN THE NEAR ZERO MAGNETIC FIELD-RANGE
9 Claims, 5 Drawing Figs.

[52] U.S. Cl. .................................................. 324/0.5,
324/43
[51] Int. Cl. .................................................. G01r 33/08
[50] Field of Search ............................................. 324/0.5 E,
0.5 F, 43

[56] References Cited
UNITED STATES PATENTS
3,242,423  3/1966  Malnar ......................... 324/0.5 F OTHER REFERENCES
R. E. Slocum and F. R. Reilly- Low Field Helium Magnetometer For Space Applications- IEEE Transations on Nuclear Science- January 1963- pp. 165- 171.

Primary Examiner—Michael J. Lynch
Attorney—Holman, & Stern

ABSTRACT: Magnetometer for measuring steady magnetic fields of steady direction in the range of the nanogauss field intensities. The apparatus is generally used for measuring weak fields in a limited region of the inside of a magnetic shield envelope and comprises a paramagnetic resonance cell, three direct current pairs of Helmholtz coils the axis of which form a three-dimensional rectangular coordinate system, the origin point of which lies in said resonance cell, and a pair of alternating current Helmholtz coils having its axis coinciding with one selected axis among those of the direct current coils. DC currents are applied to the direct current coil pairs and are adjusted to obey approximately compensate the field in said region except in the direction of said selected axis, along which exact compensation is aimed at, trihedral and an alternating current is applied to the alternating coil pair and produces an alternating magnetic field colinear with the steady field to be measured. The cell is filled with atoms of alkaline metals in vapor state or with $^4$He in the state $2^3S_1$. Pumping light is applied to the cell perpendicularly to the field to be measured and the light transmitted through the cell in the same direction as that of the pumping beam is collected on a photomultiplier. The signal delivered by the photomultiplier is filtered at the frequency of the alternating current and synchronously detected. When exact compensation of the steady field component to be measured along said selected axis is reached, the intensity of the light transmitted through the cell reaches a maximum value, and, in the light intensity modulation caused by the alternating field, the odd harmonic components pass through the zero value. The frequency of the alternating current is chosen much higher than the product of the gyromagnetic ratio of the material inside the cell by twice the direct current field variation on either side of the zero value that would reduce the light intensity change caused by the latter field to half its maximum value, and; the amplitude of the alternating field is given an optimum predetermined value. The value of the steady field component to be measured is calculated from the direct current intensity in the coil having said selected axis, while the direct current intensities in the other coils are so adjusted that the variation of said light intensity modulation as a function of the value of the latter current intensity be as sharp as possible.

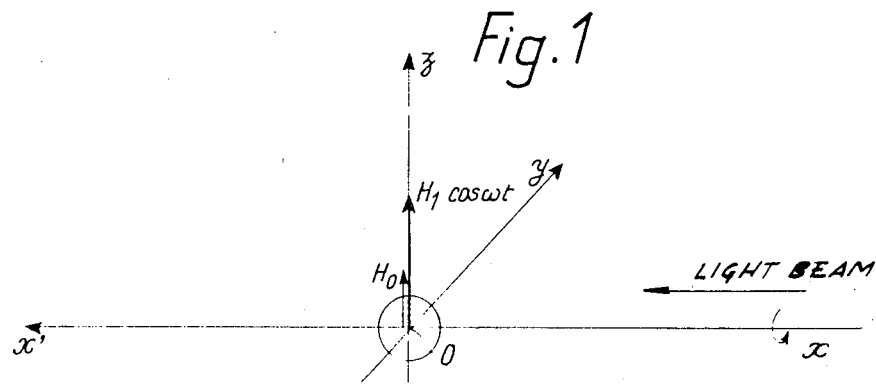
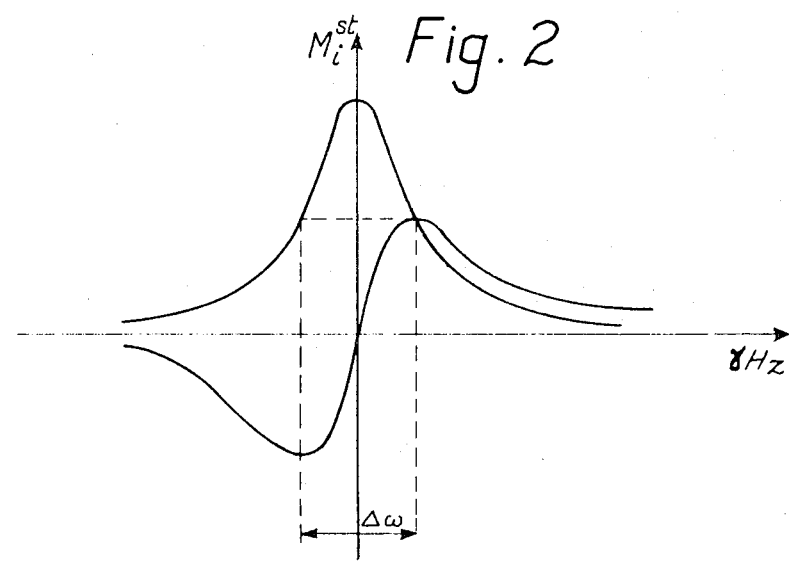
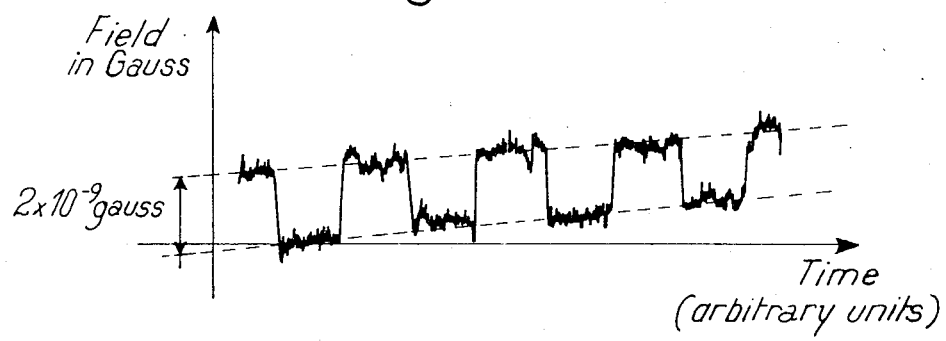

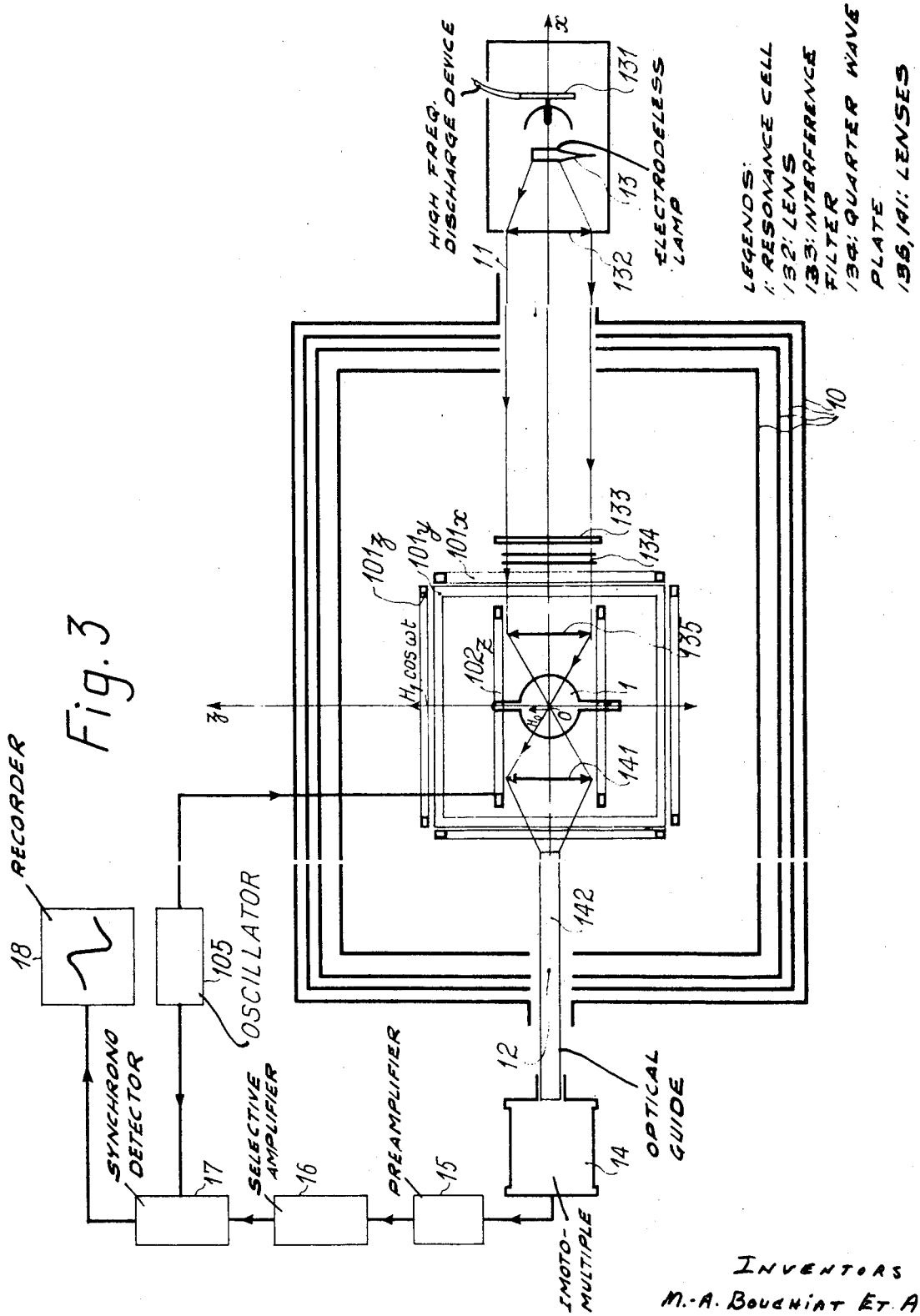

PARAMAGNETIC RESONANCE AND OPTICAL PUMPING MAGNETOMETER IN THE NEAR ZERO MAGNETIC FIELD-RANGE

This invention relates to an apparatus for measuring steady magnetic fields of steady direction and of very low amplitude.

Since such very weak fields are only found in practice inside magnetic shield envelopes in which the "ambient" fields, for instance the earth's magnetic field, have already been practically eliminated, and in which compensation means are provided for eliminating other permanent fields, the arrangement hereinafter described will be assumed to employ such a magnetic shield, although the invention proper is independent of the use of such a shield and specifically relates to the detection and measurement of very weak residual steady fields, of the nanogauss order of magnitude, having a given direction. The value of the measured field is obtained, like what is done in many devices of the prior art, from a calibration effected by means of small variations of the direct current intensity values in a plurality of pairs of so-called "Helmholtz coils" whose action, when properly adjusted, results into a total zero field at the point at which the studied weak field to be measured is subsequently introduced. However, the invention improves on the known art by the use of a new and more sensitive device for the detection of the latter field and for its measurement.

Devices for the detection of very weak steady fields are already known, which make use of what will hereinafter be called, for lack of a better name, the "Hanle effect", that is the effect in which the presence of a steady magnetic field is detected by means of the action produced in a cell containing a suitable gaseous material in an excited state on a polarized light beam passing therethrough in a direction perpendicular to that of said field. As it is well known, this effect consists in light absorption (or dispersion) which takes place to an extent all the greater that said field is stronger. When the latter field is made to vary about zero, light absorption (or dispersion) takes half its maximum value on either side of the zero field value for either of two low field values, the difference of which is conventionally called the "Hanle linewidth" and is expressed in gauss or sometimes in frequency units if its value in magnetic units is multiplied by the gyromagneter ratio of the material contained in the cell. Since the curves representing light absorption or dispersion as functions of magnetic field intensity have a shape similar to that of a resonance curve, the above-mentioned gas-field cell is often called a "resonance cell".

The apparatus according to the invention uses a resonance effect different from the just defined Hanle effect. The effect used in the invention is that produced by a transverse optical pumping, i.e., perpendicular to the direction of the DC magnetic field $H_o$ to be measured, in the presence of an auxiliary alternating magnetic field $H_1 \cos \omega t$ (of amplitude $H_1$ and angular frequency $\omega$, $t$ denoting time) colinear to the DC magnetic field, applied to suitable particles such as neutral atoms or molecules in the ground state, exhibiting electronic or nuclear paramagnetism and selected from those having a high gyromagnetic factor.

The apparatus of the invention comprises an optical resonance cell whose location marks the center of a three-dimensional rectangular coordinate system having a first, a second and a third axis, three perpendicular pairs of Helmholtz coils having their axis respectively coinciding with said axis, the magnetic field to be measured being directed along said first axis, a pair of Helmholtz coils having as their axis said first axis, supplied by an alternating current and creating an alternating magnetic field of preselected amplitude and frequency, means for producing a beam of pumping light propagating along the second axis, means for detecting the light transmitted through the cell and deriving therefrom a photoelectric signal at the frequency of the alternating magnetic field, the direction of the transmitted light beam being so selected as to give the photoelectric signal to form similar to that of a dispersion curve versus the intensity of the steady field to be measured, and means for measuring said photoelectric signal.

How to select the frequency and amplitude of the alternating magnetic field will be explained in the following.

Other features and advantages of the apparatus according to the invention will appear from the following description of its method of operation and of an exemplary nonlimitative embodiment of the apparatus according to the invention, reference being made to the accompanying drawings wherein:

FIG. 1 is a basic diagram illustrating the arrangement of the various fields along the above-mentioned first, second and third axis, respectively designated as Oz, Ox and Oy;

FIG. 2 is a graph showing variations of a component $M_r^u$ along Ox or Oy of the standing magnetic moment $M^u$ of the material in the cell and showing the forms of the resonance curves (absorption and dispersion) of use both for the Hanle effect (as above defined) and for the effect used by the invention;

FIGS. 3 and 4 show the arrangement of an embodiment of the apparatus according to the invention; and FIG. 5 is a measurement curve showing the resulting sensitivity.

Figure 4:
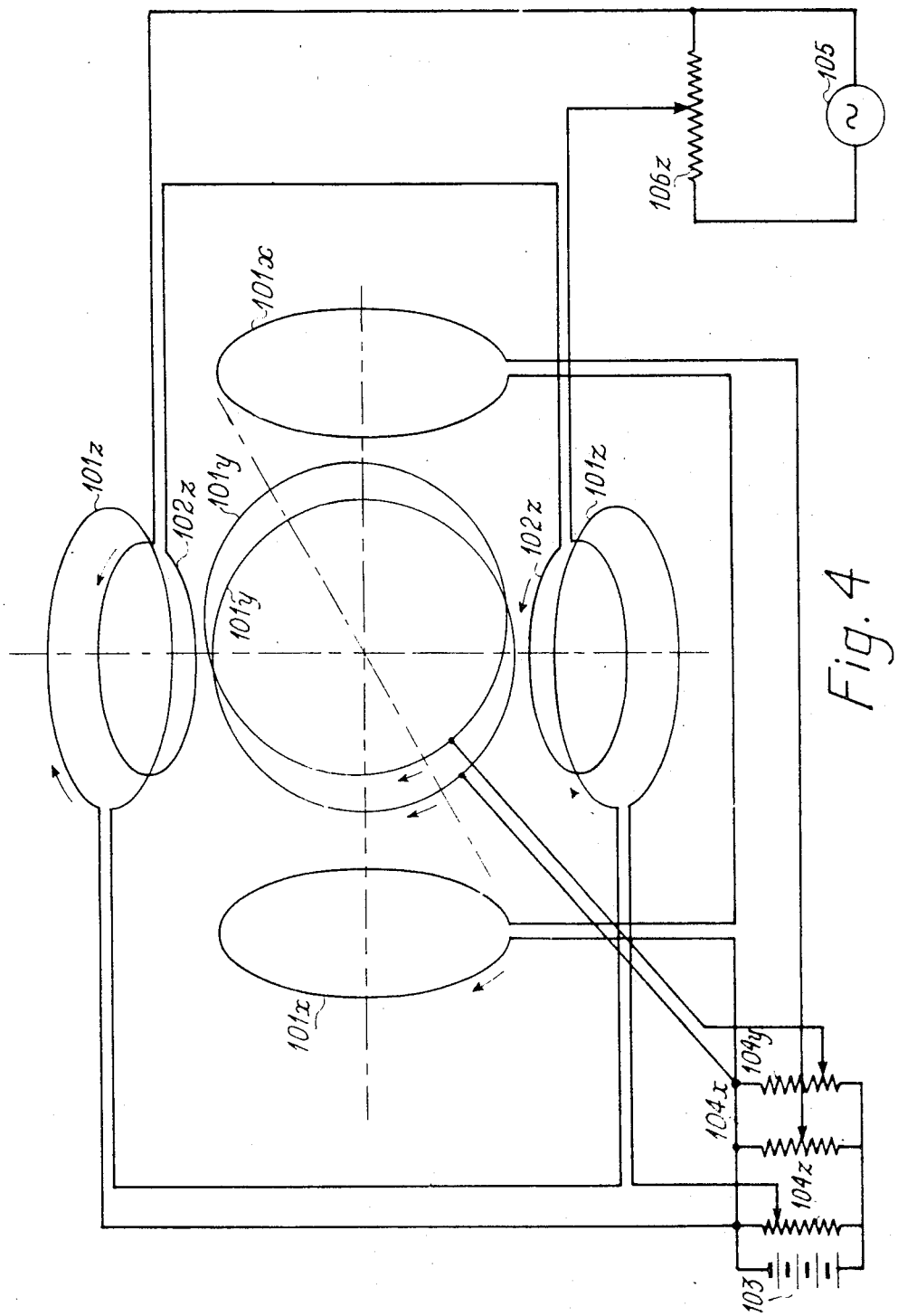

Referring first to FIG. 1, the latter shows the geometrical arrangement of the pumping light beam and of the DC and alternating magnetic fields used in the apparatus of the invention. The low-amplitude DC field $H_0$ and the auxiliary alternating field ($H_1 \cos \omega t$) are both directed along the vertical axis Oz in the plane of FIG. 1, while the pumping light beam is sent in the Ox' direction along the axis X Ox' perpendicular to Oz in the plane of FIG. 1. The third axis Oy is perpendicular to the latter plane, and the paramagnetic resonance cell is assumed to be located at point O.

An apparatus is known in the prior art for controlling by compensation a steady DC magnetic field down to zero and for measuring in strength, direction and sense the field thus compensated, this apparatus comprising measurable controlled currents flowing through a system of compensating Helmholtz coils and using an effect similar to the Hanle effect but appearing in the ground state of particles, inter alia appropriately chosen atoms, which exhibit nuclear or electronic paramagnetism in such state and which are oriented by optical pumping.

The principle of the latter effect as used in such prior art apparatus is as follows. A circularly polarized beam is used for optical pumping in a direction $xx'$ of the paramagnetic atoms contained in a resonance cell so as to impart to them a total magnetic moment M. In the presence of a magnetic field $H_o$ having a direction Oz perpendicular to Ox, the magnetic moment M precesses around the bottom of $H_o$ at the Larmor angular frequency $\omega_f = \gamma H_o$, $\gamma$ denoting the gyromagnetic ratio of the (nuclear or electronic) spin of the particular paramagnetic atoms or dipoles used. In such precession the dipoles are stressed by the thermic relaxation which makes M tend towards zero with a time constant T, and by the optical pumping tending to realign the dipoles along Ox' with the time constant $T_p$.

The theory of the then occuring effect or resonance shows that the variations, in dependence on $H_o$, of the standing components of M along the Ox and Oz axes are similar to those of an absorption curve and of a dispersion curve respectively (see FIG. 2) whose half-width "$\Delta \omega/2$" at the Larmor angular frequency is about $1/\tau = 1/T + 1/T_p$, and therefore of $1/\gamma \tau$ when expressed in field units where $\gamma$ denotes the gyromagnetic ratio.

The relaxation time $\tau$ for odd isotopes of Cd and Hg is of the order of from 1 to 100 seconds and the purely nuclear gyromagnetic ratio $\gamma$ is on the average about $10^3$ hertz/gauss (more accurately, it is 760 hertz/gauss in the case of $^{199}$Hg), so that the half-width of the resonance curves is of the order of $10^{-3}$ to $10^{-5}$ gauss. In the case of alkali metals, however, the relaxation time is of the order of 1 second and the gyromagnetic ratio can be about 1,000 times greater. For instance, the atoms of $^{87}$Rb can be concentrated in the sublevel m=2 of the hyperfine sublevel F=2 of the level $^2S_{1/2}$ (I=3/2). In the case of the sublevel F=2, if $\gamma$ and $g$ denote the gyromagnetic ratio and the Landé factor in this particular case and $\mu_B$ denotes the Bohr magneton, $\gamma = g\mu_B = \frac{1}{2} \times 1.4 \times 10^6 = 700{,}000$ hertz/gauss. In this case the half-width of the curves drops to about $10^{-6}$ gauss. Consequently, the possibility of detection by such an alkali metal of a fraction of a microgauss depends only on the signal-to-noise ratio.

Detection of the steady magnetic field in the prior art devices essentially comprises, assuming the direction of $H_o$ to be known, to colinearly superimpose to this $H_o$ field an auxiliary alternating magnetic field $H_1 \cos\omega t$ of relatively reduced amplitude, in which event $M_t$ is modulated at the angular frequency $\omega$. To facilitate electronic processing of the signal and to improve the signal-to-noise ratio, $\omega$ should be as large as possible; unfortunately, for the electron spins to be oriented by optical pumping, $\omega$ is limited by the above-defined "Hanle linewidth" - i.e., to $1/\pi\tau$. The angular frequency $\omega$ cannot in this case in fact exceed a few hertz.

The method according to the invention uses a different magnetic resonance effect in the ground state of a vapor consisting of appropriately chosen isotope atoms. If we put:
$\omega_f = \gamma H_o$   $\omega_1 = \gamma H_1$
$\gamma$ denoting the gyromagnetic factor of the ground state, then $\Gamma = 1/T + 1/T_p$, T denoting the thermic transverse relaxation time and $T_p$ denoting the optical life time of the ground state, calculation leads to the result that the total transverse magnetization of the vapor is expressed by a Fourier series in which the amplitude of the $p^{th}$ harmonic in $e^{jp\omega t}$ is:

$$A_p = \sum_{n=-\infty}^{+\infty} \frac{J_n\left(\frac{\omega_1}{\omega}\right) J_{n+p}\left(\frac{\omega_1}{\omega}\right)}{\Gamma - j(\omega_f + n\omega)} \quad (1)$$

where $j$ is $\sqrt{-1}$ and $J_n$ is the Bessel function of the first kind of $n$th order.

As can be seen, therefore, the total transverse magnetization precesses at the different frequencies $P\omega/2\pi$ (p being any algebraic integer including zero) and the effect is resonant whenever $\omega_f = n\omega$ ($n$ also denoting any algebraic integer including zero).

The physical interpretation of the phenomenon is as follows. The dipoles produced uniformly in time in the Ox direction by optical excitation subsequently have their Larmor frequency modulated by $H_1 \cos \omega t$. They therefore group themselves in bunches in the plane perpendicular to $H_o$. The mean angular velocity of the dipoles is $\omega_f$ and during a period $2\pi/\omega$ of the field $H_1$ they have rotated through an angle $(2\pi/\omega)\omega_f$ which, for the bunching effect to be cumulative, must be a multiple of $2\pi$, thus explaining the resonance condition $\omega_f = n\omega$. The total magnetization therefore performs a periodic movement of period $2\pi/\omega$ whose expansion as a Fourier series is the one given by formula (1).

Formula (1) shows clearly an important characteristic of these resonances. Since the modulus of the denominator of formula (1) does not depend on $\omega_1$, resonance width is independent of $H_1$.

The invention uses only the resonance in quasi-zero field $H_o$, in other words, $\omega_f$ very close to zero and $n=0$ resonance curves ($n=0$) detected on the pth harmonic can be deduced readily from formula (1). The values of the real and imaginary parts of the expression of formula (1) are respectively given by:

$(\Gamma/\Gamma^2 + \omega_f^2) J_o (J_p + J_{-p}) \cos p\omega t$
$(\omega_f/\Gamma^2 + \omega_f^2) J_o (J_p - J_{-p}) \sin p\omega t$
and the argument of the Bessel functions J being $\omega_1/\omega = \gamma H_1/\omega$.

Clearly, therefore, the resonances have a half-width $\Gamma = 1/T = 1/T_p$, which is the same as the above-defined half-width of a Hanle resonance; also, since $J_n = (-1)^n J_{-n}$, the resonances appear in the form either of a pure absorption curve or of a pure dispersion curve, according as $p$ is even or odd. Conveniently, $p$ is odd (for instance $p=1$), the dispersion curve then approximating to a straight line near the origin, so that the signal varies linearly in dependence upon the $H_o$ strength of the field to be measured.

The advantages of using the novel resonance effect will now be clearly apparent. A resonance line as fine as that of a Hanle resonance is available, and fineness is independent of the $H_1$ and $\omega$ parameters of the auxiliary alternating field used, $\omega$ can therefore be almost as high as required, the $\omega$-modulated signal being suitable for processing by known selective amplification and synchronous detection techniques, with a consequent considerable increase in measurement sensitivity. In the prior art on the contrary the alternating magnetic field frequency has to be quite low in comparison with the Hanle linewidth as above defined. In the low field helium magnetometer for space applications of Robert E. Slocum and Francis N. Reilly disclosed in IEEE Transactions on Nuclear Science, Vol. 10, Jan. 1963, pages 165 to 171, the modulation frequency $\omega$ is 25 Hz. quite small with respect to the width of the state $2^3S_1$ of He which is of the order of 10 kHz. The modulation frequency in the invention is taken between 50 and 1,000 Hz. which is quite high with respect to the Hanle linewidth from 1 to 10 Hz. In fact, as will be seen hereinafter, it is possible to achieve a sensitivity of a fraction of a nanogauss, the fraction depending only on the signal-to-noise ratio. The value $H_1$ can be chosen to correspond to the first (highest) peak of the curve representing the product $J_o \times J_1$ of the zero order and first order Bessel functions, in which event the signal depends only on the second order of the variations of the auxiliary field strength $H_1$. The product $J_o(\omega_1/\omega) \times J_1(\omega_1/\omega)$ is maximal for $\omega_1/\omega = 1.2$. Thus $H_1$ will be selected such that:

$$H_1 = 1.2\omega/\gamma$$

To increase measurement sensitivity to the limits of the possible, resonance line width must be reduced as much as possible. This point will be discussed later after a description of an embodiment of an apparatus for performing the method of the invention.

An embodiment of such an apparatus, of use in a terrestrial laboratory, will now be described with reference to FIGS. 3 and 4.

An enclosure shielding against the earth's magnetic field and local magnetic noise comprises a number of concentric casings 10 which are made of an appropriate metal and which are disposed at a reduced distance apart from one another and which are pierced just with the apertures required for the pumping light beam to enter and for the detection light beam to leave. In the embodiment chosen the casings, in the form of concentric coaxial cylinders, are made of a high magnetic permeability iron-nickel alloy which has been given very thorough heat treatment and demagnetization. The casings are about 2 millimeters thick, have dimensions of approximately 1 meter and are spaced apart from one another by a distance of about 2.5 cm. The cylinder end walls consist of removable covers provided with apertures 11 and 12 coaxial to the cylinders 10. A complete casing of this kind provides a shielding factor of approximately $10^5$, and so the uncompensated earth's magnetic field in the enclosure is reduced to around 5 microgauss.

The enclosure is arranged with the axis Ox between its apertures perpendicular to the direction Oz of the very small magnetic field $H_o$ whose strength it is required to measure and whose source (not shown) is inside the shielded enclosure. The DC magnetic field may be produced by a magnetic rock for example. The axis Ox is the axis of the pumping light beam which propagates in the direction opposite to Ox, as shown by the arrow in FIG. 3, and of the detection light beam, both such beams being produced in a manner to be described hereinafter.

An optical resonance cell 1, hereinafter called a "cell" for the sake of simplicity, is centered on the shielded enclosure and is embodied by a bulb, e.g. of heat-resisting glass, of preferably spherical shape and having a diameter of e.g. 6 centimeters. Cell 1 contains saturated vapor of $^{87}Rb$ at a temperature near the ambient temperature, e.g. at 20° C. To improve the thermic relaxation time of the vapor, the inside surface of the bulb wall is coated in hydrogenated or, preferably, deuterated paraffin. The bulb also has a temperature control facility (not shown).

Four pairs of Helmholtz coils also centered on the shielded enclosure are provided. Three pairs—$101_x$, $101_y$, $101_z$—, each in the Helmholtz position and aligned with the Ox, Oy and Oz axes respectively, are used to compensate for the residual magnetic field inside the shielded enclosure. The fourth coil pair, $102_z$, which is aligned with the Oz axis, is energized by an adjustable frequency oscillator 105 to produce along Oz, and therefore in the direction of magnetic field $H_o$, an auxiliary audiofrequency magnetic field $H_1 \cos \omega t$ which is essential to produce the required resonance.

The pairs of coils $101_x$, $101_y$, $101_z$ are supplied by direct current source 103 through potentiometers $104_x$, $104_y$, $104_z$ and the pair of coils $102_z$ is supplied by oscillator 105 through potentiometer $106_z$.

Outside the shielded enclosure an electrodeless lamp 13 also containing $^{87}$Rb vapor *abd* energized by a high frequency discharge device 131 is disposed on the Ox axis and orientates the Rb atoms of the cell by optical pumping. The characteristics of the lamp 13, that is the various parameters acting on the light strength of the pumping beam, are such as not to widen excessively the Rb energy levels in the cell yet to ensure effective optical pumping. We shall revert to this point later.

The pumping light beam from lamp 13 is collected by a first lens 132, e.g. of transparent plastic material; such beam enters the enclosure through aperture 11 and passes first through an interference filter 133, which linearly polarizes the beam, and then through a polarizing and quarter-wave plate 134 system which polarizes it circularly, the beam finally being focused by a second lens 135 on the cell center 0.

The radiated light beam transmitted through the cell along the axis Ox is collected by another lens 141 and focused on the end of a rod-shaped optical guide 142, e.g. of Plexiglass, through which the light goes to a photomultiplier 14 disposed on the axis Ox but outside the shielding enclosure.

As already stated, the light received by the photomultiplier comprises components modulated at the angular frequency $\omega$ and its harmonics, whose amplitude varies with the strength $H_o$ of the field to be measured and which are also present in the photoelectric current.

The resulting signal goes to a preamplifier 15 and then to a selective amplifier 16 which selects one of the modulated components, for instance the component at angular frequency $\omega$, and then to a synchronous detector 17 which gets its reference signal from the oscillator 105. The output signal from the synchronous detector goes to a direct-current pen recorder 18.

As already stated, sensitivity is higher in proportion as the resonance line width is smaller and as the signal-to-noise ratio is higher.

With regard first to the thermal cause for resonance line width, the relaxation time $T_1$ due to impacting of the Rb vapor atoms against the wall of the spherical cell, which has a diameter of about 6 centimeters and contains no buffer gas but whose walls are coated with hydrogenated or, preferably, deuterated paraffin, is in excess of 1 second, so that we get a first term of line width $d$ of $1/\pi T_1 = 0.3$ hertz. Exchange collisions between Rb atoms at a temperature of about 20° C. also help to broaden the line width by a second term $1/\pi T_2$ of about 0.2 hertz. On the other hand, inhomogeneities of the magnetic field are "averaged out" by atom movements and below about 20 microgauss do not contribute to any broadening of the resonance line width, provided that all the magnetic materials which may produce considerable inhomogeneities of the field in the cell have been excluded from the shielded space. This is why inter alia the metal casings of the enclosure are carefully demagnetized and why the photomultiplier, whose dynodes are magnetic, is placed outside the shielded space. Finally, if the required precautions are taken, the best width obtainable for the resonance line from the thermic point of view is $1/\pi T_1 + 1/\pi T_2$, or around 0.5 hertz.

Turning now secondly to the optical reason for resonance line width, the light strength I of the pumping beam, although increasing detection signal strength, causes the resonance line to widen in proportion to I and also increases photomultiplier noise in proportion to $\sqrt{I}$. There is therefore an optimum value for the pumping light strength which does not correspond to the finest possible resonance line.

EXAMPLE

In a laboratory equipment corresponding to the embodiment hereinbefore described, the following results have been achieved with the operating parameters:

Line width: of thermal origin, $1/\pi T_1 + 1/\pi T_2 = 1$ hertz of optical origin, $1/\pi T_p = 3$ to 4 hertz Sensitivity: (see FIG. 5), related to the scale given in FIG. 5 and to residual noise, approximately $(2 \times 10^{-9}/4 \approx 5 \times 10^{-10}$ gauss.

FIG. 5 shows how small pulse-shaped variations, artificially produced for checking the sensitivity of the equipment, of the magnetic field to be measured about the zero value are registered on the recorder 18.

It seems hardly necessary to stress the importance of stability of the various parameters of the equipment in time, including pumping beam light strength, cell temperature, power supply to the compensating coil windings, voltage applied to the photomultiplier etc.

The operation of the magnetometer is the following. The magnetometer is given such an orientation that the magnetic field to be measured is directed along Oz. The components $H_x$, $H_y$, $H_z$ of the ambient magnetic field are compensated by a cut-and-try process controlling the currents in the Helmholtz coils $101_x$, $101_y$, $101_z$ by means of potentiometers $104_x$, $104_y$, $104_z$ and observing the results on the recorder 18 of FIG. 3. For this purpose, after a rough adjustment of the three potentiometers $104_x$, $104_y$, $104_z$, which corresponds to a first minimum reading of recorder 18 the sensitivity of which may be momentarily reduced if necessary, the potentiometers are adjusted again for a nearer-to-zero new reading of 18, and so on, till the sharpest and most precise possible adjustment of $104_z$ is obtained. Experience shows that the successive adjustments so effected are converging to actual compensation of the ambient fields to be eliminated and, at the same time, of all residual fields possibly existing in the directions of and perpendicular to the very weak field to be measured later. Thereafter, the sample producing the latter field is introduced into the enclosure, and the value of the corresponding very weak field is read on the recorder 18, the calibration of which may be derived from the effects of small variations intentionally given to the direct currents in the various coil pairs. The amplitude $H_1$ of the alternating field is given its optimal value by means of potentiometers $106_z$. As already stated, this optimal value is:

$$H_1 = 1.2 \omega / \gamma$$

By assuming $\omega/2\pi = 400$ Hz. one finds
$H_1 = 0.7$ milligauss for $^{87}$Rb, $^{39}$K, $^{23}$Na;
$H_1 = 1$ milligauss for $^{85}$Rb;
$H_1 = 1.4$ milligauss for $^{133}$Cs;
$H_1 = 0.35$ milligauss for the state $2^3S_1$ of $^4$He.

What we claim is:

1. Magnetometer for measuring steady magnetic fields of a given direction in the nanogauss range, comprising a magnetic shield envelope, in said envelope a paramagnetic resonance cell containing atoms of a gaseous material selected from the group consisting of $^{87}$Rb, $^{85}$Rb, $^{133}$Cs, $^{39}$K, $^{23}$Na, $^4$He in the state $2^3S_z$, three perpendicular pairs of Helmholtz coils centered on said cell, the axis of said pairs of coils being directed respectively along said given direction and along a second and a third directions perpendicular thereto and to each other, a direct current generator feeding said coils, means for controlling the direct current in each of said pairs of coils for compensating the ambient magnetic fields in the envelope, an additional pair of Helmholtz coils centered on said cell and having its axis directed along same said given direction, an alternating current generator of a frequency comprised between 50 and 1,000 Hz. and feeding said additional pair of coils, means for controlling the amplitude of the alternating magnetic field produced by said additional pair of coils, and outside said envelope a pumping light source emitting a pumping beam directed along said second direction, a light detector receiving the beam portion transmitted through said resonance cell along said second direction and delivering at its output an electrical signal, a band-pass filter having its input connected to said light detector output and having its passband centered on the frequency of said alternating current generator, and a synchronous detector connected to the output of said filter and controlled by said alternating current generator, said detector feeding a direct-current recorder, and the intensity of said alternating field being adjusted to a value substantially equal to 1.2 times the quotient of the angular frequency of said alternating current generator by the gyromagnetic factor of said gaseous material.

2. Magnetometer as set forth in claim 1 in which the resonance cell is internally coated with hydrogenated paraffin.

3. Magnetometer as set forth in claim 1 in which the resonance cell is internally coated with deuterated paraffin.

4. Magnetometer as set forth in claim 1 in which the gaseous material in the resonance cell is $^{87}$Rb and the alternating magnetic field amplitude control means is set to 0.7 milligauss.

5. Magnetometer as set forth in claim 1 in which the gaseous material in the resonance cell is $^{85}$Rb and the alternating magnetic field amplitude control means is set to 1 milligauss.

6. Magnetometer as set forth in claim 1 in which the gaseous material in the resonance cell is $^{133}$Cs and the alternating magnetic field amplitude control means is set to 1.4 milligauss.

7. Magnetometer as set forth in claim 1 in which the gaseous material in the resonance cell is $^{39}$K and the alternating magnetic field amplitude control means is set to 0.7 milligauss.

8. Magnetometer as set forth in claim 1 in which the gaseous material in the resonance cell is $^{23}$Na and the alternating magnetic field amplitude control means is set to 0.7 milligauss.

9. Magnetometer as set forth in claim 1 in which the gaseous material in the resonance cell is $^{4}$He in the state $2^{3}S_{1}$ and the alternating magnetic field amplitude control means is set to 0.35 milligauss.

* * * * *